Patented June 24, 1924.

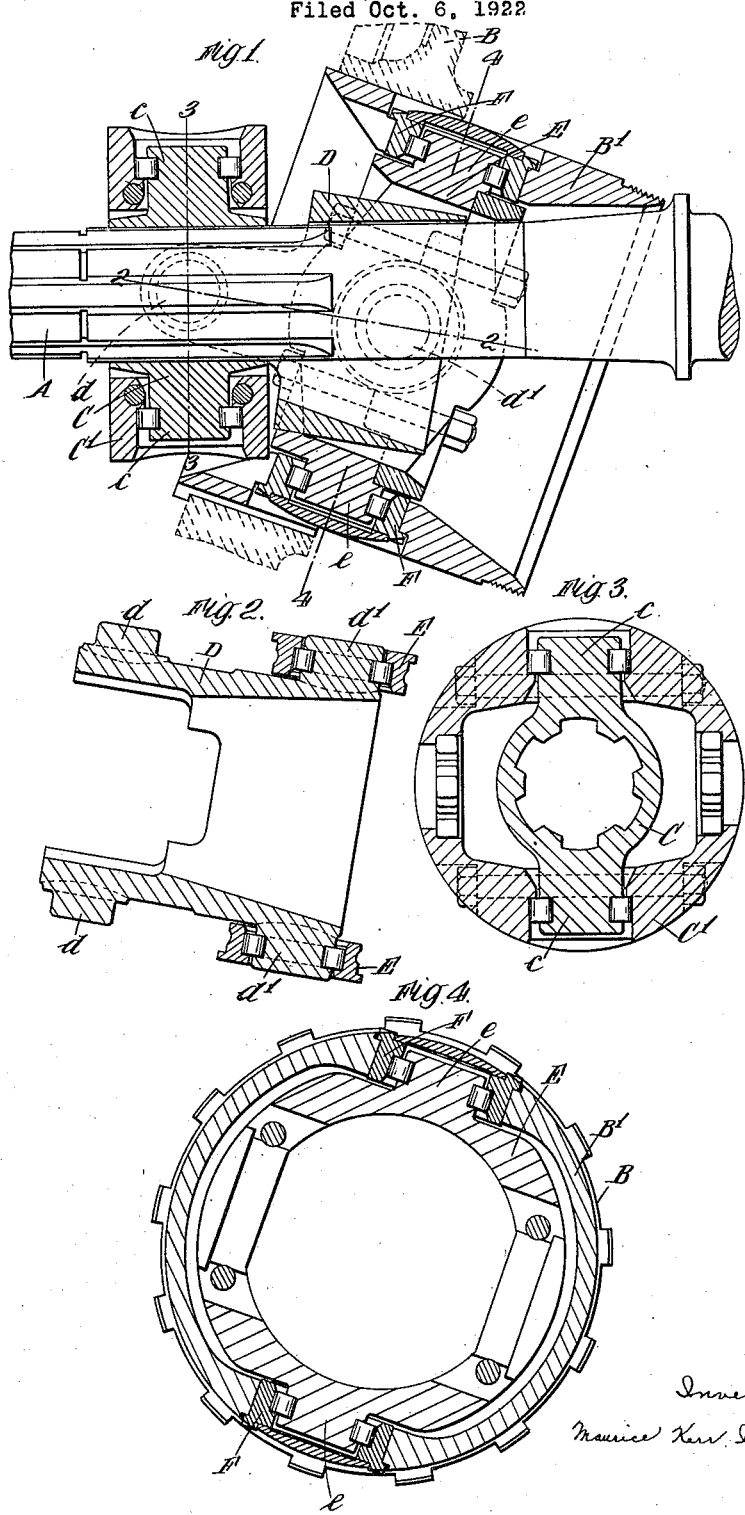

1,498,876

UNITED STATES PATENT OFFICE.

MAURICE KERR INGOLDBY, OF WESTMINSTER, LONDON, ENGLAND, ASSIGNOR TO THE VARIABLE SPEED GEAR LIMITED, OF WESTMINSTER, ENGLAND, A BRITISH COMPANY.

POWER-TRANSMISSION DEVICE.

Application filed October 6, 1922. Serial No. 592,683.

*To all whom it may concern:*

Be it known that I, MAURICE KERR INGOLDBY, a subject of the King of Great Britain, residing at Broadway Court, Broadway, Westminster, in the county of London, England, have invented certain new and useful Improvements in or Relating to Power-Transmission Devices, of which the following is a specification.

This invention relates to power transmission devices and more especially to hydraulic pumps and motors of the swash-plate type comprising a rotary cylinder barrel or body having a number of cylinders arranged parallel to the axis of rotation of the said barrel and adapted to receive pistons whose rods are carried at their outer ends by a swash-plate or socket ring rotatably mounted in a so-called tilting box or angle box which can be adjusted to assume different inclinations to vary the stroke of the pistons or which is permanently set at a fixed inclination to give a constant stroke to the pistons.

The chief object of this invention is to provide the power transmission device with improved means for enabling a constant angular velocity during its revolution to be obtained, the said means comprising a double universal joint which is placed between a shaft and a revolving member (such as the aforesaid socket ring) surrounding the shaft which double universal joint according to the present invention is composed of two joints of the pin or Hooke's type, one of these joints being carried by the shaft and the other by the revolving member surrounding the shaft. By the use of this improved form of double universal joint we are able to ensure a mathematically correct angular velocity relationship between the shaft and the said revolving member surrounding this shaft. For the purpose of the invention the joint carried by the shaft may comprise a collar slidably connected (by means of keys and keyways for example) to the shaft, which collar is trunnioned to a ring surrounding the collar, and the joint carried by the revolving member surrounding the shaft may comprise another collar trunnioned to the said member or a part carried thereby. The ring of the first joint and the collar of the second joint may be connected together by a yoke which is trunnioned by parallel trunnion pins to the said ring and collar.

In order that the said invention may be clearly understood and readily carried into effect the same will now be more particularly described with reference to the accompanying drawings, in which:—

Figure 1 is a sectional side elevation of a double universal joint according to the invention, Figure 2 is a section of the aforesaid yoke forming part of the joints, the line of section being represented by 2, 2 in Figure 1, Figure 3 is a section of the aforesaid collar and ring of the joint carried by the shaft, the line of section being represented by 3, 3 in Figure 1, and Figure 4 is a section of the aforesaid ring and collar of the joint carried by the revolving member surrounding the shaft, the line of section being represented by 4, 4 in Figure 1.

A is the aforesaid shaft and B is the revolving member surrounding this shaft. The said shaft may be the driving shaft of a pump unit or the driven shaft of a motor unit and the revolving member B may be the socket ring of a pump unit or a motor unit of the swash-plate type as aforesaid.

C is the collar slidably connected by keys and keyways to the shaft A and C' is the ring surrounding this collar, the pins $c, c$ engaging in holes in the ring C'. D is the aforesaid yoke which surrounds the shaft A and has trunnion pins $d, d$ engaging in holes in the ring C' so as to rock about an axis at right angles to the trunnion pins $c, c$. This yoke has another pair of trunnion pins $d', d'$ which are arranged parallel to the trunnion pins $d, d$ and engage in holes in a second collar E. The latter collar has trunnion pins $e, e$ which are arranged at right angles to the trunnions $d', d'$ and engage in bushes F, F mounted in a ring B' rigidly secured to the aforesaid revolving member B. Anti-friction rollers are interposed between each of the aforesaid trunnion pins and the holes in which they engage.

It is to be observed that the double universal joint can be used not only in mechanism where the member surrounding the shaft is set at a fixed angle to the shaft or is capable of being rocked relatively to the shaft about a centre situated in the axis of the shaft as is the case with the swash-plate of a pump or motor, but also in mechanism where the said member is situated in, or is capable of adjustment to, a position in which its axis is parallel to the axis of the shaft. The said double universal joint can also be used in mechanism where the said shaft-surrounding member is arranged at a fixed angle to the shaft (or is capable of being rocked relatively to the shaft) and can also partake of bodily movement towards and away from the shaft, that is to say to mechanism in which the axis of the shaft-surrounding member intersects the axis of the shaft at different points along the latter axis.

What I claim and desire to secure by Letters Patent of the United States is:—

1. In a power transmission device, the combination with a shaft and a revolving member surrounding said shaft, of a collar connected to said shaft, a ring surrounding said collar, means for trunnioning said ring to said collar, a second collar, means for trunnioning the latter collar to said revolving member, a yoke member, and means for trunnioning said ring and the second-mentioned collar in said yoke member.

2. In a power transmission device, the combination with a shaft and a revolving member surrounding said shaft, of a collar slidably connected to said shaft, a ring surrounding said collar, means for trunnioning said ring to said collar, a second collar, mean for trunnioning the latter collar to said revolving member, a yoke member, and means for trunnioning said ring and the second-mentioned collar in said yoke member.

MAURICE KERR INGOLDBY.